(12) United States Patent
Rousseau et al.

(10) Patent No.: US 8,879,528 B2
(45) Date of Patent: Nov. 4, 2014

(54) METHOD FOR ALLOCATING RESOURCES, IN A MOBILE AND MESHED COMMUNICATIONS NETWORK, WITH LIMITATION OF THE INTER-CLUSTER INTERFERENCE, SYSTEM AND NETWORK IMPLEMENTING THE METHOD

(75) Inventors: Stéphane Rousseau, Saint Cyr l'Ecole (FR); Fabien Esmiol, Suresnes (FR); Vania Conan, Paris (FR)

(73) Assignee: Thales, Neuilly sur Seine (FR)

( * ) Notice: Subject to any disclaimer, the term of this patent is extended or adjusted under 35 U.S.C. 154(b) by 453 days.

(21) Appl. No.: 13/328,774

(22) Filed: Dec. 16, 2011

(65) Prior Publication Data

US 2012/0155441 A1 Jun. 21, 2012

(30) Foreign Application Priority Data

Dec. 17, 2010 (FR) ...................................... 10 04937

(51) Int. Cl.
*H04W 72/10* (2009.01)
*H04W 84/18* (2009.01)

(52) U.S. Cl.
CPC .................................... *H04W 72/10* (2013.01)
USPC .......................................... 370/338; 370/329

(58) Field of Classification Search
None
See application file for complete search history.

(56) References Cited

U.S. PATENT DOCUMENTS

| 7,027,409 | B2 * | 4/2006 | Cain .............................. | 370/252 |
| 8,130,736 | B2 * | 3/2012 | Smith et al. .................... | 370/338 |
| 2004/0019576 | A1 | 1/2004 | Chang et al. | |
| 2005/0089045 | A1 | 4/2005 | Shim et al. | |
| 2008/0317047 | A1 | 12/2008 | Zeng et al. | |
| 2009/0257413 | A1 * | 10/2009 | Smith et al. .................... | 370/338 |
| 2011/0013601 | A1 | 1/2011 | Cerasa et al. | |

FOREIGN PATENT DOCUMENTS

| FR | 2910655 A1 | 6/2008 |
| WO | 2008/155624 A2 | 12/2008 |

OTHER PUBLICATIONS

Vijaynarayanan Subramanian, et al., "Experimental Study of Link and Transport Protocols in Interference-Prone Wireless LAN Environments", Communication Systems and Net-works and Workshops, Jan. 5-10, 2009, pp. 1-10.
Lucian Popa, et al., "Balancing Traffic Load in Wireless Networks with Curveball Routing", MobiHoc, Sep. 9-14, 2007, pp. 170-179.
Herve Aiache, et al., "A Load Dependent Metric for Balancing Internet Traffic in Wireless Mesh Networks", Proceedings of 3rd IEEE International Workshop on Enabling Technologies and Standards for Wireless Mesh Networking, Oct. 2009.
Ananta Pandey, et al., "CTB-MAC: Cluster-Based TDMA Broadcast MAC Protocol for Mobile Ad-hoc Network", 2010 5th International Conference on Future Information Technology, May 2010, pp. 21-23.

* cited by examiner

*Primary Examiner* — Robert C Scheibel
(74) *Attorney, Agent, or Firm* — Baker Hostetler LLP (57) ABSTRACT

Allocation of communications resources, in a mobile meshed network structured as a plurality of clusters each comprising at least one node, includes: generating a chart of configurations each comprising a different allocation priority index for each time slot of the time window, the indices varying from 0 to n−1; assigning a configuration,—among the generated set of configurations, to each cluster such that a predetermined number $N_p$ of priority indices are not assigned to the same slots for the clusters which are mutually adjacent; and allocating the time slots to the intra cluster communications in the order of priorities which are defined in the configuration assigned to the cluster, the priority index associated with a slot increasing with the order of allotting of a slot to a new communication, a new slot being allotted only if all the slots whose priority index is smaller are already allocated to a communication.

12 Claims, 7 Drawing Sheets

METHOD FOR ALLOCATING RESOURCES, IN A MOBILE AND MESHED COMMUNICATIONS NETWORK, WITH LIMITATION OF THE INTER-CLUSTER INTERFERENCE, SYSTEM AND NETWORK IMPLEMENTING THE METHOD

CROSS-REFERENCE TO RELATED APPLICATION

This application claims priority to foreign French patent application No. FR 1004937, filed on Dec. 17, 2010, the disclosure of which is incorporated by reference in its entirety.

FIELD OF THE INVENTION

The present invention relates to the field of mobile and meshed communications networks, for example mobile ad-hoc networks. The invention also relates to cellular mobile networks. Such networks comprise a plurality of nodes interconnected together by way of radio links. The nodes of the network are items of radio communication equipment, for example a computer terminal equipped with a wifi link, a portable telephone or any other wireless communication device. A node can also designate a mobile vehicle carrying an onboard wireless communication device.

The invention relates more precisely to the allocation of communication temporal resources in a mobile network, in particular time division multiple access to the transmission medium (TDMA).

BACKGROUND

Mobile ad-hoc networks are characterized by a capability for organizing themselves, without predefined infrastructure, to ensure the transport of communications with a specified quality and for configuring themselves automatically so as to respond to the system deployment requirements. Moreover such a network must be able to ensure its maintenance in an autonomous manner, in particular the nodes of the network being mobile, it must be possible for the topology of the network to be updated continually.

In a mobile ad-hoc network, it is indispensable to design and implement a process for simultaneous access to the transmission resources so as to prevent simultaneous communications between several users or groups of users from interfering with one another.

The problem of the removal or limitation of interference between users in a mobile network is crucial since it directly impacts the service quality that can be provided by such a network.

The problematic issue of interference between users in a wireless network is treated in diverse ways in the state of the art.

Firstly, solutions are known which are based on the application of specific transport protocols with built-in processes for monitoring and correcting interference related errors at the price of a decrease in the useful throughput. For example, processes of ARQ "Automatic Repeat Request", FEC "Forward Error Correcting" or H-ARQ "Hybrid Automatic Repeat Request" type are used to combat the disturbances engendered by the interference of communications between users but they introduce either redundancy data which impact the useful throughput or an additional transmission lag that is sometimes incompatible with certain real-time applications such as voice over IP. By way of example, document [1] presents a study of the transport protocols making it possible to combat the phenomenon of interference in a wireless network.

Other known processes are based on the use of routing protocols, implemented at the network layer level, with the aim of maximizing the utilization of the resources of the wireless network. By way of example, the process described in document [2] is based on estimation of the interference generated by the communications, that described in document [3] takes into account an anticipation of future interference.

Finally there exist processes for simultaneous access to the physical resources of the transmission medium which are implemented at the level of the physical layer or of the MAC layer. These processes are aimed at sharing the resources between the various users so as to avoid collisions.

The CSMA/CA (Carrier Sense Multiple Access with Collision Avoidance) multiple access process uses a mechanism for dodging collisions between communications which is based on a principle of reciprocal acknowledgement of receipt between the sender and the receiver. If the network is congested, transmission is deferred. In the converse case, if the transmission medium is available for a given time, transmission is carried out for this time. The sender transmits a message containing information about the volume of the data that it desires to send and its transmission speed. The receiver dispatches a message to the sender telling it that the medium is available for a send, and then the sender begins sending its data. After reception of all the data sent, the receiver dispatches an acknowledgement of receipt to the sender. All the neighbouring senders then wait a time estimated to be necessary for the transmission of the volume of information to be sent. The CSMA/CA access process is notably used by Wifi networks.

The CDMA (Code division multiple access) multiple access process relates to a system for coding transmissions which is based on the spread spectrum technique. Several digital links can use the same carrier frequency by virtue of a spreading code allocated to each. The receiver uses the same spreading code to demodulate the signal that it receives and to extract the useful information. The spreading codes used have an orthogonality property which guarantees the avoidance of collisions between communications of various users. The code itself does not transport any useful information. The despreading operation on reception requires significant calculation capabilities, therefore more expensive components.

The FDMA (Frequency division multiple access) multiple access process consists in slicing the useful frequency band into sub-bands so as to allot a part of the spectrum to each user. In this way, the collisions between users which do not communicate on the same frequencies, are reduced.

Figure 1:
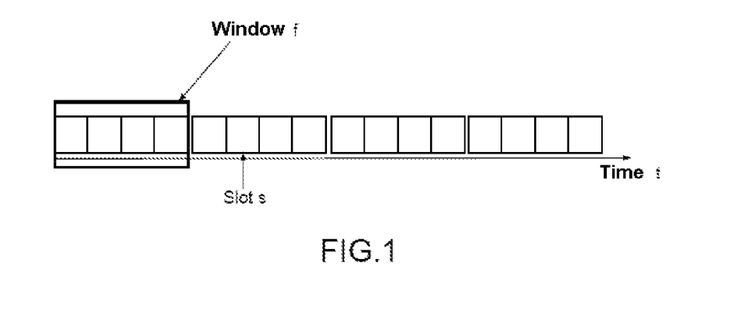

Finally, TDMA (Time division multiple access) multiple access processes are known, based on a temporal division of the resources and of the multiple access to the transmission medium. These processes implement a time slicing into disjoint windows 100 each lasting a duration equal to a predetermined period T. Each time window 100 is divided into a plurality S of time slices 110 of duration T/S also called slots 110. An exemplary time slicing into windows 100 and slots 110 is represented in FIG. 1. When one terminal wishes to communicate with another, they agree over the choice of the time slots 110 during which the communication will be carried out by taking into account the communications performed by the other terminals in the vicinity so as to avoid all collisions with them. This process guarantees service quality but requires the mutual synchronization of all the terminals of the network as well as a knowledge of the communications undertaken by the other terminals so as to make at any instant the right choice of allotment of time slots to each user. In order to operate, this process therefore requires cooperation between the terminals and this may pose a problem for networks of large size.

To achieve this cooperation on a meshed network whatever its size, one process consists in introducing a hierarchy between the terminals. The terminals are thus grouped into subsets, also called clusters, in which a unique terminal, called the cluster-head, acts as leader and has the function of scheduling the communications in the slots of the TDMA time window for all the terminals of the cluster while taking care to see that there are no collisions between the communications of each terminal. The other terminals of the cluster have a direct tie with the cluster-head, they are either members if they are linked only to members of the cluster, or relay nodes if they have a tie with a terminal belonging to another cluster.

Figure 2:
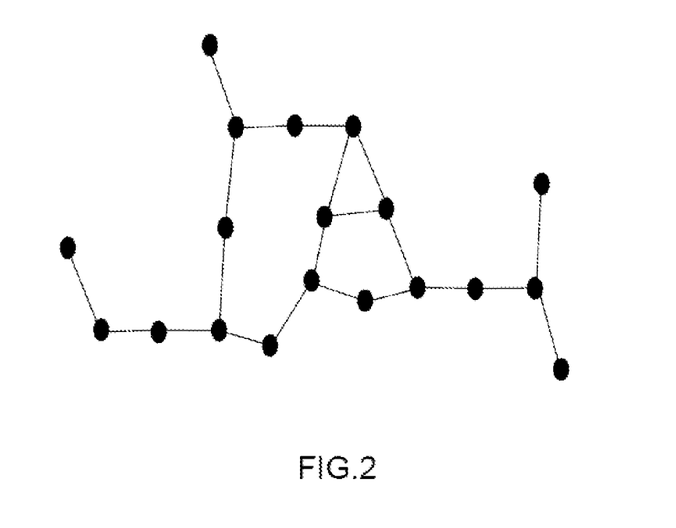
Figure 3:
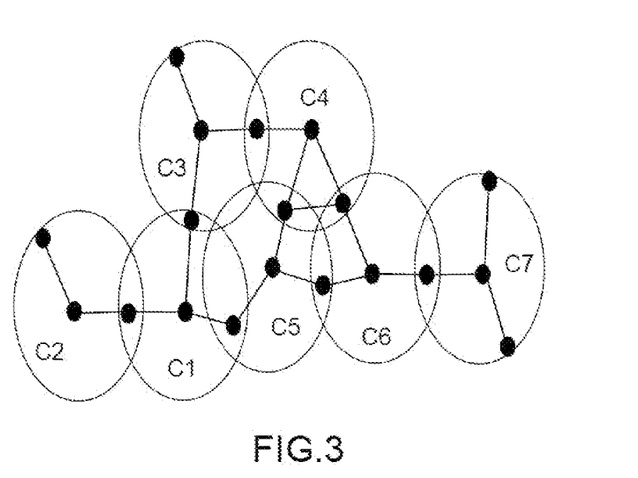

An exemplary meshed network topology without particular hierarchy is represented in FIG. 2. The same network organized into clusters is represented in FIG. 3. Each cluster is identified by its cluster-head terminal, referenced by the letter C and a number, and by a circle of radius substantially equal to the range of a radio link between two terminals. The terminals situated inside a circle belong to cluster i managed by cluster-head terminal C.

Such an organization into clusters makes it possible to delegate the allocation of the resources to certain terminals for a group of adjacent terminals. Each cluster manages its communications independently of the other clusters, thereby allowing management of the resources on large-scale networks.

However, this independent management by clusters entails risks of collisions between the communications of two adjacent clusters. An adjacent cluster is a cluster immediately neighbouring another. In the example of FIG. 3, the clusters C2, C3 and C5 are adjacent to the cluster C1. Likewise the clusters C4, C5 and C7 are adjacent to the cluster C6. The clusters having no knowledge of the slots chosen by the other clusters, it is possible that two clusters may be sufficiently close for the communications of one to impede the communications of the other and may choose the same slots for their communications, thus creating collisions between their communications.

A problem with the TDMA multiple access processes associated with an organization of the meshed network into clusters is therefore that the prevention of collisions or interference between clusters is not guaranteed. For it to be so, the process for accessing the resources must make it possible to minimize the chances of two or more adjacent clusters choosing the same time slots to communicate.

A solution to this problem is presented in document [4]. It is based on the definition of super time windows composed of a plurality Nf of TDMA time windows. Each super window is assigned to a different cluster, in an arbitrary manner, with the sole constraint of not assigning the same super window to two adjacent clusters. This solution makes it possible to avoid interference between neighbouring clusters, however, its effectiveness is limited since it entails a lag equal to at least the duration of a super window, between two communications. Moreover the number Nf of time windows allocated to a cluster is defined as a function of an a priori estimation of the number of neighbouring or adjacent clusters. Thus, this process does not take into account the dynamic aspect of the topology of a mobile network and does not allow optimal apportioning of the resources for clusters which exhibit a number less than Nf of adjacent clusters.

SUMMARY OF THE INVENTION

The present invention is aimed at remedying the aforementioned limitations of the known multiple access processes by proposing a process making it possible to limit, or indeed to remove, inter cluster interference while guaranteeing optimal apportionment and assignment of the resources.

For this purpose, the subject of the invention is a method for allocating communications resources in a mobile meshed network comprising a plurality of nodes communicating with one another by way of radio links, the said communications resources consisting of at least one time window comprising at least a plurality of time slots during which the said nodes are or are not authorized to communicate, the said meshed network being structured as a plurality of clusters each comprising at least one node, the said method being characterized in that it comprises at least the following steps:

a step of generating a chart of configurations each comprising a different allocation priority index for each time slot of the said time window, the said indices varying from 0 to n−1, n being a strictly positive integer equal to the number of time slots, a step of assigning a configuration, from among the generated set of configurations, to each cluster in such a way that a, strictly positive, predetermined number $N_p$ of priority indices are not assigned to the same slots for the clusters which are mutually adjacent, a step of allocating the time slots to the intra cluster communications in the order of the priorities which are defined in the configuration assigned to the said cluster, the priority index associated with a slot for example increasing with the order of allotting of a slot to a new communication, a new slot being allotted only if all the slots whose priority index is smaller are already allocated to a communication.

In a variant embodiment of the invention, the generation of the configuration chart is carried out at least with the aid of the following steps:

a step of initializing the priority indices of the first configuration to given values, for each configuration of index c varying from 2 to the total number of configurations $N_c$, a step of generating a sequence $MIN_c$ comprising n values associated with the n time slots, the value $MIN_c(s)$ of the sequence $MIN_c$ associated with a slot of index s in the time window is taken equal to the minimum index from among the priority indices of the said slot of index s in all the previously generated configurations, a step of generating a sequence $SUM_c$, comprising n values associated with the n time slots, the value $SUM_c(s)$ of the sequence $SUM_c$ associated with a slot of index s in the time window is taken equal to the sum of the priority indices of the said slot of index s for all the previously generated configurations, a step of separating the priority indices between indices of compulsory priority and indices of optional priority, the indices of compulsory priority being strictly smaller than the ratio n/c, the indices of optional priority being greater than the ratio n/c, a step of assigning the compulsory priority of index p to the time slot of index s for which the sequence $MIN_c$ exhibits a maximum value, if several slots comply with this condition, then the compulsory priority of index p is assigned to the slot for which the sequence $SUM_c$ exhibits a maximum value, a step of assigning the optional priority of index p to the time slot of index s for which the sequence $SUM_c$ exhibits a maximum value, if several slots comply with this condition, then the optional priority of index p is assigned to the slot for which the sequence $MIN_c$ exhibits a maximum value.

In another variant embodiment of the invention, the generation of a different chart of configurations is carried out for each group (G1,G2) of clusters comprising only mutually adjacent clusters, the initialization step being carried out on the basis of the configuration allocated to a cluster of the said group also belonging to another group or on the basis of an arbitrary configuration when none of the member clusters of the said group is also a member of another group.

In another variant embodiment of the invention, to each cluster is assigned the configuration of minimum index c, in the chart of configurations, which is not already assigned to another cluster.

In another variant embodiment of the invention, within a cluster, the communications are prohibited on the slots associated with a priority index greater than a predetermined threshold.

In another variant embodiment of the invention, in each cluster, a node executes the cluster leader function, the step of allocating the time slots to the intra cluster communications as a function of their priority index being executed by this node.

In another variant embodiment of the invention, the step of assigning the configurations to each cluster is carried out by distributed means comprising at least the broadcasting, by each cluster, of its configuration index to its adjacent clusters.

In another variant embodiment of the invention, the said network is a cellular network and the cluster-leader node is a base station.

In another variant embodiment of the invention, the time window is a TDMA window.

In a particular aspect of the invention, the method according to the invention is implemented by the MAC and/or network layers of the protocol stack of each node.

The subject of the invention is also an onboard communication system embedded in a mobile node (Ci) communicating within a mobile ad-hoc network, characterized in that it comprises means suitable for implementing the method according to the invention.

The subject of the invention is also an ad-hoc network comprising a plurality of mobile nodes (Ci) communicating with one another, characterized in that each of the said nodes (Ci) comprises an onboard communication system according to the invention.

BRIEF DESCRIPTION OF THE DRAWINGS

Other characteristics and advantages of the invention will become apparent with the aid of the description which follows offered in relation to appended drawings which represent:

FIG. 1, an illustration of a time slicing according to a process for simultaneous access to the TDMA resources, FIG. 2, an exemplary meshed network topology without particular hierarchy, FIG. 3, the example of FIG. 2 with an organization of the network by clusters, FIG. 4, an example, according to the invention, of assigning priorities to the slots of a time window, FIG. 5, an exemplary configuration chart generated according to the invention, FIG. 6, an exemplary allocation of configurations to each cluster of a group of two adjacent clusters, FIG. 7, an exemplary allocation of configurations to each cluster of a group of three adjacent clusters, FIG. 8, an exemplary allocation of configurations to each cluster of a group of four adjacent clusters, FIG. 9, a flowchart of the steps of implementing the method according to the invention culminating in the generation of a set of configurations, FIG. 10, an example, in a variant embodiment of the invention, of allocating configurations to each cluster comprising a first group of three adjacent clusters and a second group of two adjacent clusters, FIG. 11, an illustration of the time slicing of a TDMA window.

DETAILED DESCRIPTION

Figure 4:
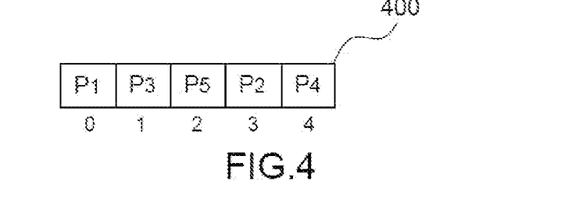

In order to avoid collisions between communications resulting from adjacent clusters, the method according to the invention consists, initially, in assigning a priority of use to each slot of a time window. FIG. 4 illustrates this principle. Represented therein is a time window 400 sliced into slots. With each slot is associated a different numeral varying from 0 to N−1, N being the number of slots in a time window. The priority of use of a slot is all the higher the smaller the associated numeral. The numeral defining the priority of a slot will subsequently be designated the priority index. The set of the priorities associated with the slots of a time window is called a configuration. When a node of a cluster asks the leader node of the cluster for access to the communication resources, the leader allocates, for this communication, the unused time slot which exhibits the highest priority identified by the smallest priority index. In the example of FIG. 4, the first communication will be allocated to the time slot of priority index 0, the slot of priority index 4 being allocated solely when the other four time slots are already assigned to a communication. In a variant embodiment of the invention, if the priority index of a slot is greater than a given threshold, the leader node of the cluster can prohibit the communication on this slot.

To avoid inter cluster interference, the same time slot must not be assigned simultaneously to the communications emanating from two adjacent clusters. In order to comply with this constraint, the method according to the invention is notably aimed at assigning, for the same slot, a different priority to each cluster of a set of adjacent clusters. In this way, the number of configurations generated is equal to the number of slots of a time window.

Figure 5:
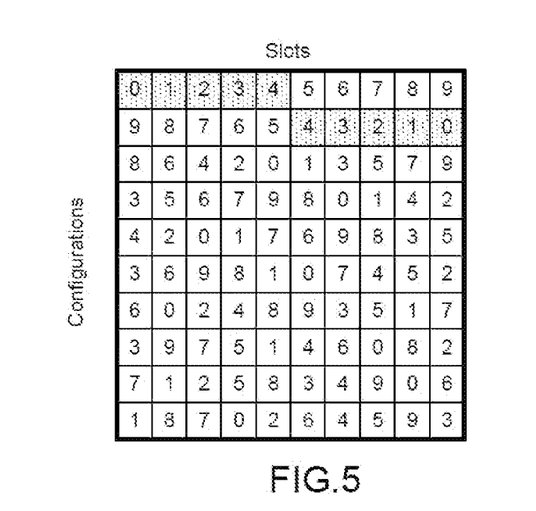

FIG. 5 represents the set of configurations generated by the method according to the invention for a time window comprising 10 slots. This example is given by way of illustration and is not representative of the order of magnitude of the number of slots per time window which is, in practice, of the order of a hundred. Each configuration (represented as ordinate) exhibits a different priority value for the same time slot (represented as abscissa). In this way, each cluster, which organizes the communications within itself according to a given configuration, is the only one to have the highest priority on a time slot. In practice, it suffices that a cluster has the highest priority on a number of slots equal to $$N_p = \frac{n}{1 + n_{adj}},$$

where $n_{adj}$ is the number of clusters which are adjacent to it. The generation of the configurations according to the invention makes it possible to satisfy this condition up to a number of adjacent clusters equal to the number of time slots of a window, this being amply sufficient in practice.

Once the chart of the set of configurations has been generated, a configuration is assigned to each cluster. Several examples of the assignment of configurations are now illustrated in support of FIGS. 6, 7 and 8 while employing the exemplary configuration chart of FIG. 5, defined for ten time slots.

Figure 6:
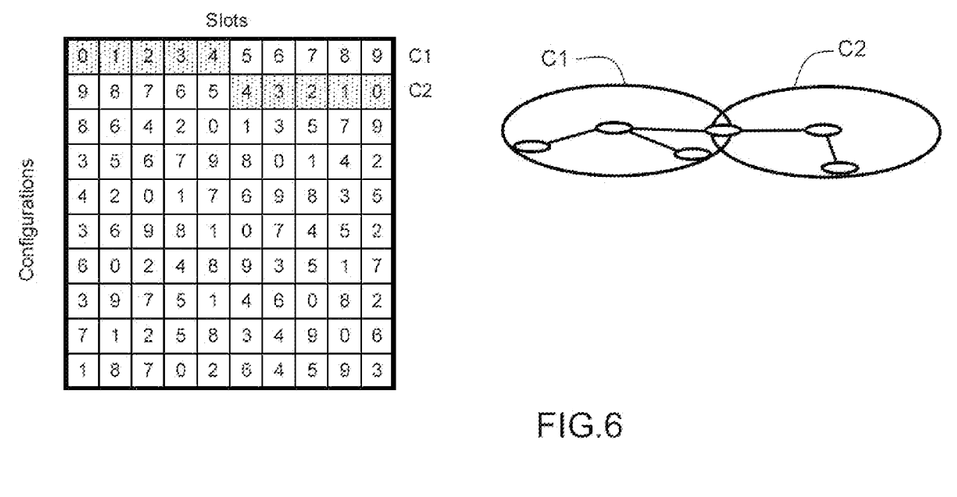

FIG. 6 illustrates an example of allocations of configurations to each cluster of a group of two adjacent clusters C1 and C2. The first configuration of the chart of the set of possible configurations is assigned to the cluster C1. The second configuration is assigned to the cluster C2. Thus, each cluster possesses the highest priority on half the slots of the time window, i.e. five slots in total.

Figure 7:
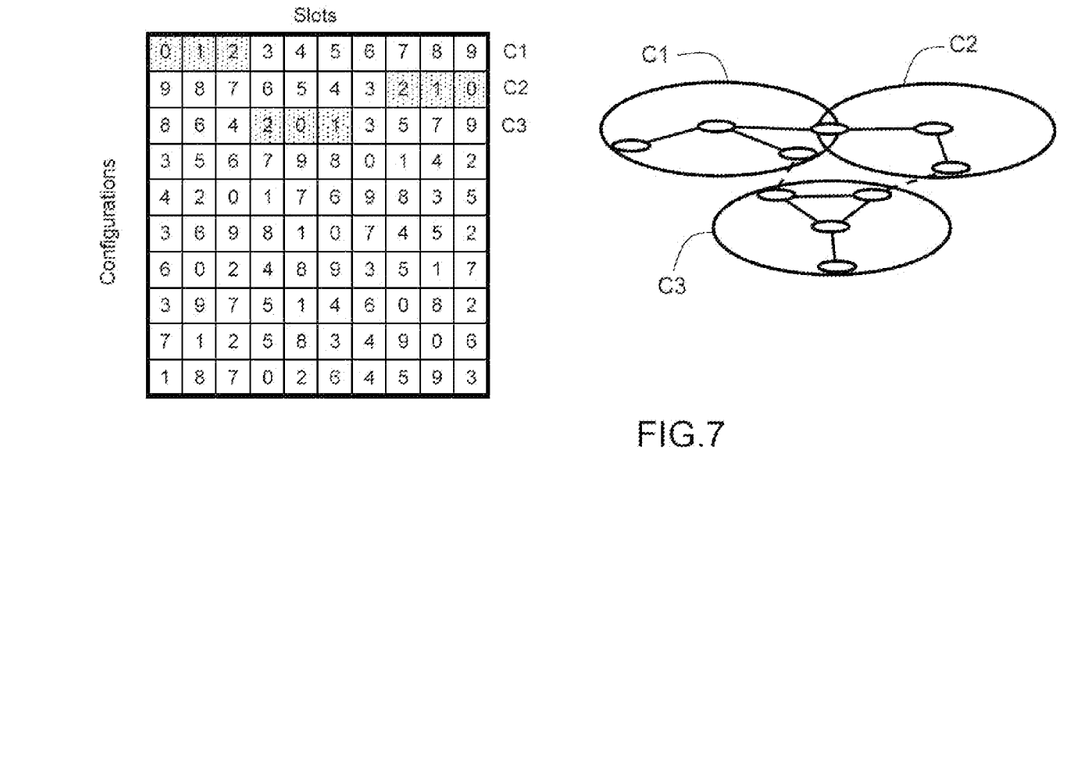

FIG. 7 illustrates an example of allocations of configurations to each cluster of a group of three adjacent clusters C1, C2 and C3. The first configuration of the chart of the set of possible configurations is assigned to the cluster C1. The second configuration is assigned to the cluster C2. The third configuration is assigned to the cluster C3. Thus, each cluster possesses the highest priority on a third of the slots of the time window, i.e. three slots in total.

Figure 8:
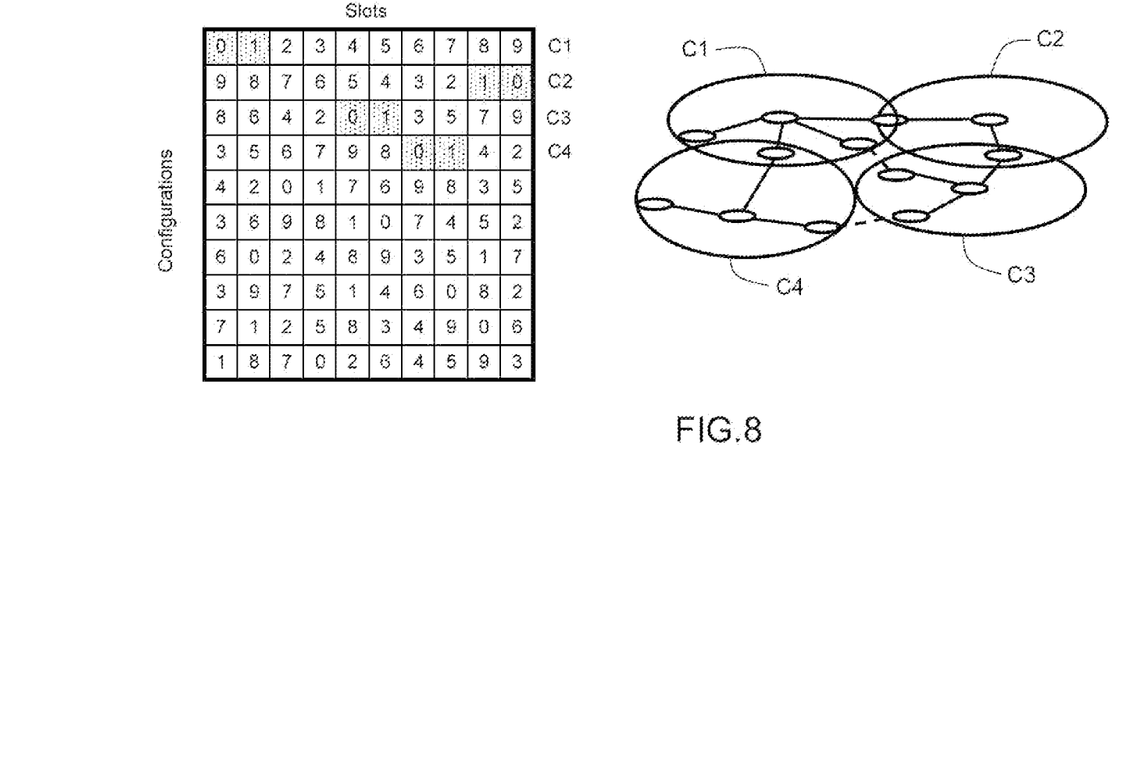

FIG. 8 illustrates an example of allocations of configurations to each cluster of a group of four adjacent clusters C1, C2, C3 and C4. The first configuration of the chart of the set of possible configurations is assigned to the cluster C1. The second configuration is assigned to the cluster C2. The third configuration is assigned to the cluster C3. The fourth configuration is assigned to the cluster C4. Thus, each cluster possesses the highest priority on a quarter of the slots of the time window, i.e. two slots in total.

The method, according to the invention, implemented to generate, in an automatic manner, the set of possible configurations is now described. This method is executed by each cluster-leader node (cluster-head).

Figure 9:
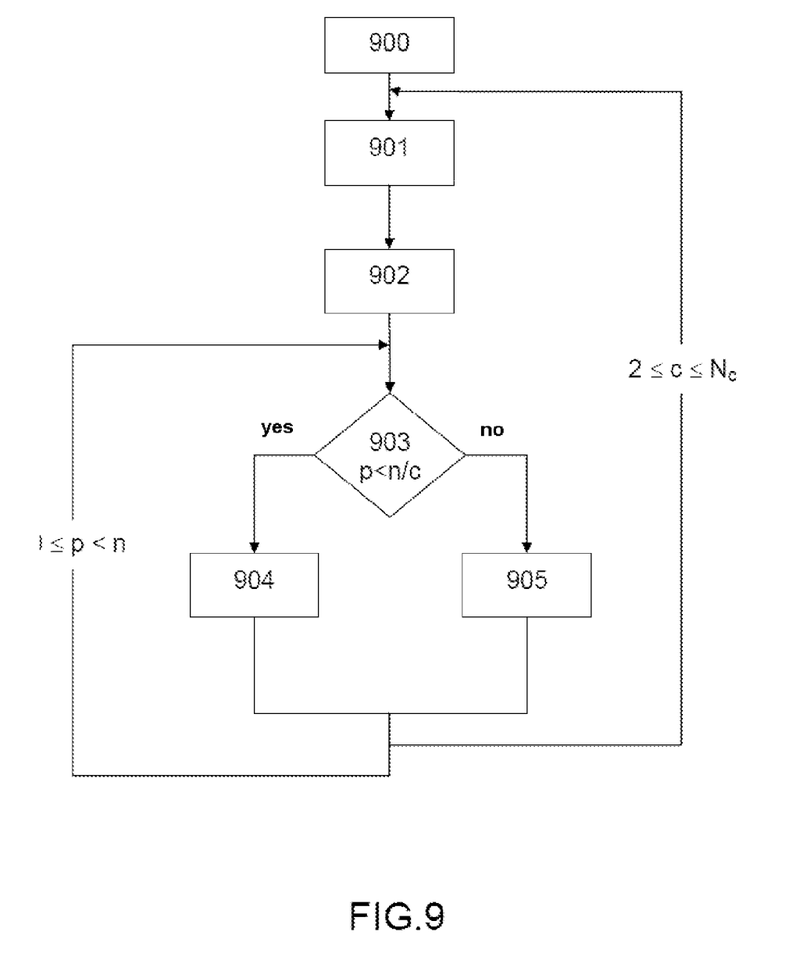

FIG. 9 shows diagrammatically, in the form of a flowchart, the steps of implementing the generation of the set of configurations according to the invention.

The first configuration 900 is defined arbitrarily, for example its priority indices are assigned to the time slots in their increasing order of appearance over time.

A sequence $MIN_c$ which comprises n values associated with the n time slots is determined, in a first step 901, for each configuration of index c varying from 2 to the total number of configurations $N_c$, which is at most equal to the number n of time slots in a window. For a given time slot of index s, the corresponding value of the sequence $MIN_c(s)$ is taken equal to the minimum index from among the priority indices of this slot in all the previously generated configurations.

In a second step 902, a sequence $SUM_c$, also comprising a number of values n equal to the number of time slots, is determined. For a given time slot of index s, the corresponding value of the sequence $SUM_c(s)$ is taken equal to the sum of the priority indices of this slot for all the previously generated configurations.

The configuration of index c is thereafter defined with the aid of steps 903 to 906. The generation of a configuration consists in associating each priority index p varying from 0 to n−1 with a time slot.

In a test step 903 the priority indices are separated into two groups. Accordingly, the current priority index p is compared with the ratio n/c. If p is less than n/c then the priority associated with this index is called a compulsory priority, in the converse case it is called an optional priority. The ratio n/c corresponds to the minimum number of slots for which each cluster of a group of adjacent clusters must have the highest priority, this being with the objective of eliminating the inter-cluster interference. In a variant embodiment of the invention, the cluster-leader node can prohibit the communication on the time slots benefiting from an optional priority so as to use only the time slots associated with a compulsory priority which guarantees the total absence of collisions between communications of several adjacent clusters.

If p is the index of a compulsory priority, it must be assigned to a time slot which has not already benefited from another compulsory priority in a previous configuration. In a step 904, the compulsory priority of index p is assigned to the time slot of index s for which the sequence $MIN_c$ determined in step 901 exhibits a maximum value. If several slots comply with this condition, then the compulsory priority of index p is assigned to the one for which the value of the sequence $SUM_c$ is a maximum.

If p is the index of an optional priority, it must be assigned to a time slot which has not already benefited from the same priority in a previous configuration. In a step 905, the optional priority of index p is assigned to the time slot of index s for which the sequence $SUM_c$ determined in step 902 exhibits a maximum value. If several slots comply with this condition, then the optional priority of index p is assigned to the one for which the value of the sequence $MIN_c$ is a maximum.

Once the chart of the set of possible configurations has been generated, it is necessary to allot a particular configuration to each cluster so as to allow it to organize its communications while minimizing the risk of collisions with its neighbouring clusters. An embodiment of the invention which relates to the implementation, in a distributed manner, of the allotting of a configuration to each cluster is now described. Without departing from the scope of the invention, the method described also applies to an ad-hoc network which is not structured in the form of clusters, the configurations being in this case allotted directly to each node of the network which accesses the communication temporal resources as a function of the priorities defined in the configuration which is allotted to it. This typical case applies notably to networks of small size, comprising a small number of nodes and which do not require a particular hierarchization. It also applies to networks of larger size not organized into clusters. The invention also applies, in a similar manner, to a cellular network in which several mobile nodes are structured as cells around a fixed base station. The configurations are allotted to the base stations which play a similar role to that of the cluster-head leader node.

The method according to the invention, in a first particular embodiment, is now described for the particular example of a network organized into clusters. The formation of the clusters can be performed with the aid of known processes termed clusterization, for example the process based on the "Low_Id" algorithm which allots the cluster-head function to the nodes of the network exhibiting the smallest identifiers. The formation of the clusters may be done as a function of various topological characteristics. In particular, a cluster may be defined by the distance in terms of number of hops between the cluster-head and the members of the cluster or else by the type of relay node between two clusters. A relay node can belong to several clusters, the communication between these clusters always travelling through it or conversely the clusters may be defined in such a way as to all be mutually disjoint and in this case the intra cluster communication is effected by means of two nodes which are each members of two neighbouring clusters and which carry out the relay nodes function.

Each cluster-head node executes a distributed method according to the invention making it possible to allot it a configuration.

For this purpose, each node of the network stores at least the following information: its unique identifier within the network which is allotted to it from the outset of the formation of the network, the identifier of the cluster-head node of the cluster to which it belongs, the state of this node, namely whether it is a cluster-head node, a relay node or a simple member node. Each node also stores the configuration in which the cluster to which it belongs is situated, the number of clusters in the network, the number and the list of clusters adjacent to its cluster which contains notably the identifier of the cluster-head node and the configuration of each adjacent cluster.

Each cluster-head node creates and broadcasts in the network, at a given time interval, an information message, in the form of a specific data packet, which comprises notably the following information: the identifier of the cluster-head node originating the message, the configuration chosen by this cluster-head node and the number of hops traversed by the message.

The information message created by the cluster-head node is broadcast to all the nodes of the network which are directly within its range. On receipt of the message, the nodes execute the following steps. If the receiver node is a simple member node, the message is destroyed. If the receiver node is a relay node, the message is broadcast to all the nodes which are directly within its range. If the receiver node is a cluster-head node then it updates the list of clusters which are adjacent to it with the configurations that they use and chooses a configuration, from among those generated by the method according to the invention, which has not already been chosen by an adjacent cluster. Each cluster-head node thus has knowledge of the configurations chosen by the adjacent clusters, it chooses, for example, the immediately available (that is to say which has not yet been assigned to a cluster) configuration of the chart, in the descending order of the rows of the chart.

The distributed method making it possible to allot a configuration to each cluster such as described hereinabove is merely an exemplary implementation of the invention. Any method, algorithm or process making it possible to allot a configuration to each cluster in such a way that a cluster does not use the same configuration as one of these adjacent clusters is conceivable. Such a method must be executed at least by each cluster-head node and must be based on the exchanging of information, in a distributed manner, between the nodes and the clusters of the network in such a way as to coordinate the allotting of the configurations and thus allow an allocation of optimal resources for each cluster.

A second embodiment of the invention for the assignment of the configurations generated according to the process described in support of FIG. 9 to the clusters of the network in such a way as to further increase the use of the temporal resources while limiting the collisions between adjacent clusters is now described.

Figure 10:
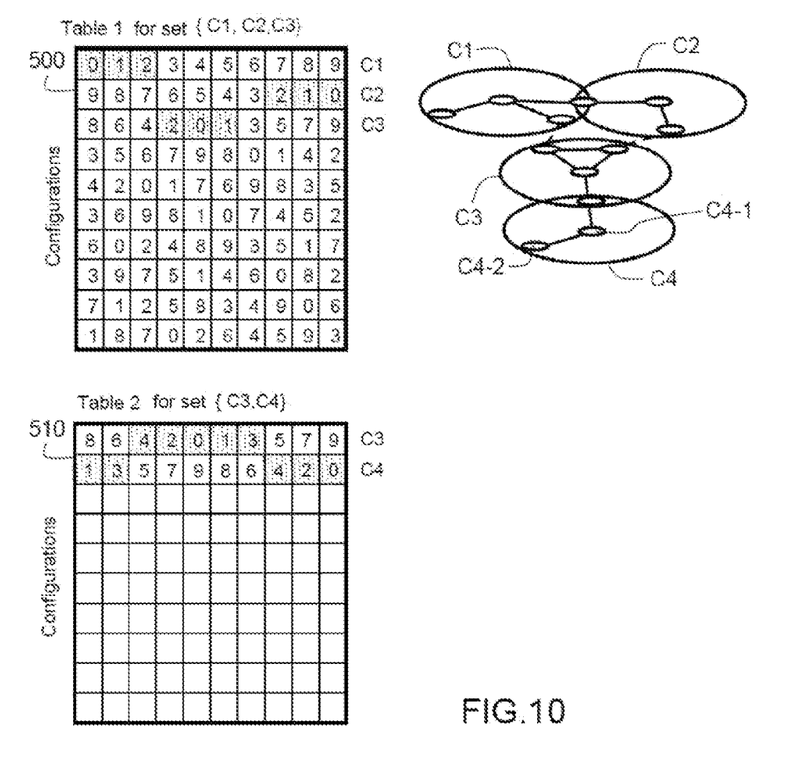

FIG. 10 shows diagrammatically, in its right part, another exemplary meshed network topology organized into clusters. The clusters C1, C2 and C3 form a first group of mutually adjacent clusters. The allocation of the configurations to these three clusters is done in the manner described in support of FIG. 7. A fourth cluster C4 is formed when two nodes C4-1 and C4-2 enter the network. The cluster C4 is solely adjacent to the cluster C3. To utilize the communication resources to the maximum without engendering collisions between the communications of the clusters C3 and C4, it suffices that the cluster C4 has a greater allocation priority than the cluster C3 on half the slots of the window. Now, the configuration allocated to C3 is already allotted on the basis of the adjacency with C1 and C2. C3 uses the configuration of index c=3 in the initially generated chart 500. The cluster C4 having only a single neighbour, the first configuration available in the chart 500 is that of index c=1 (first row of the chart). Now, the use of this configuration does not guarantee the cluster C4 that it will benefit from the highest priority, with respect to the cluster C3, on half the slots, but only on a third, in accordance with the process used to generate the chart 500.

In a particular embodiment of the invention, a single configuration chart is generated for each group of adjacent clusters. Such a group comprises only clusters which are adjacent to all the other clusters of this same group. In the example of FIG. 10, a first group G1 of adjacent clusters is defined by the set of clusters {C1,C2,C3} and a second group G2 is defined by the set of clusters {C3,C4}. The group G1 uses the chart 500 generated with the arbitrarily chosen initial configuration {0, 1, 2, 3, 4, 5, 6, 7, 8, 9}. The group G2 uses a chart 510 generated with the aid of the same process described in support of FIG. 9 but initialized with the configuration already allocated to C3. The configuration allocated to C4 is the first one available in the chart 510 which is assigned to its group G2 of adjacent clusters. It is therefore the second configuration of the chart 510. Thus, the cluster C4 does indeed benefit from the highest priority, with respect to the cluster C3, on half the slots of the window and not only on a third.

The generation of a configuration chart specific to each group of adjacent clusters requires the implementation of the following exchanges of information within the network. In addition to knowing the identifier of its cluster, each cluster-head node must know the identifier of that group or those groups of adjacent clusters G1, G2 to which the cluster that it represents belongs. One and the same cluster can belong to several adjacent clusters as illustrated in the example of FIG. 10.

The cluster-head nodes of each cluster must communicate, for example by way of specific information messages, with the other cluster-head nodes of the group or groups of adjacent clusters to which they belong the configuration identifier that they have chosen (in practice the identifier is the row number of the configuration chart generated) and the identifier of the group of adjacent clusters to which they belong. Each cluster-head node thus stores the list of configurations that are chosen by the clusters which are adjacent to it. If a cluster forms part of several groups of adjacent clusters, for example the cluster C3 in the example of FIG. 10, then it chooses its configuration as a function of the configuration table shared by one of the groups, for example the group G1, by taking the immediately available configuration in this table. It thereafter transmits to the other group of adjacent clusters, the group G2 in the example of FIG. 10, the configuration that it has chosen with a configuration index equal to 1. The other clusters of the group G2 not yet having chosen any configuration, the configuration of the cluster C3 is indeed the first one allocated in the group G2 and thus bears, in this group, index number 1.

The nodes having the function of relay between two adjacent clusters transmit the specific information message or messages to the adjacent clusters as a function of the identifier of membership in a group of adjacent clusters included in these messages.

On receipt of an information message, a cluster-head node performs the following operations. If the said message contains a configuration index equal to 1 and the configuration itself, the cluster-head node executes the method for generating a new configuration table, described in support of FIG. 9, by initializing the method with the configuration contained in the message. The cluster-head node thereafter chooses the configuration index immediately available in the order of the configurations of this new table. This index is optionally updated if in parallel another cluster of the same group has already preempted the same configuration. If conversely the message contains a configuration index different from 1, then the cluster-head node uses the configuration table in memory, updates the list of the configurations that have been used by its neighbours, within the same group, and chooses the next configuration available in this table.

Without departing from the scope of the invention, the method of allocating a configuration to each cluster may be carried out according to one or the other alternately of the embodiments described applied to the set of nodes of the network or according to any other variant not described explicitly which makes it possible to allocate to each cluster the highest priority, with respect to its adjacent clusters, on a predetermined number $N_p$ of slots.

Figure 11:
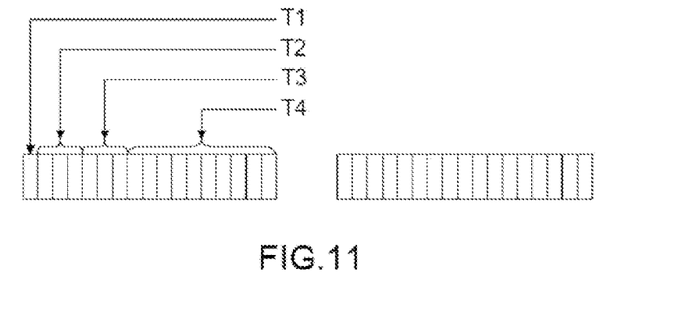

As soon as a definitive configuration is allotted to a cluster, the cluster-head node can organize the allotting of the resources within the cluster as a function of the priorities defined in the configuration. Access to the communication medium is effected, as indicated previously, by a TDMA process. The time slots on which the nodes are or are not authorized to communicate are included in a time window called a TDMA window. A TDMA window is typically composed of four distinct parts such as is represented in FIG. 11. In the first part T1, a signal allowing the synchronization of all the members of the cluster with its cluster-head is dispatched. The second part T2 serves for the calculation of the scheduling of the requests sent previously by the members of the cluster, that is to say which slots will be used by each terminal. In the third part T3, the members of the cluster dispatch their new requests relating to their requirements in terms of resources. Finally, the last part T4 is composed of the time slots which will actually be used by the terminals to transmit their data in accordance with the scheduling performed previously by the cluster-head.

Each cluster employs this type of window. The configurations generated according to the invention apply to the last part of the window which relates to the slots used for data transmission. The configurations will give an order of priority to be complied with among these slots.

The method according to the invention is executed by each node of the network, or when the node is organized into clusters, by each node having the cluster head function. More precisely, it may be implemented by the MAC and/or network layers of the protocol stack executed by each node.

REFERENCES

[1] Subramanian, V.; Ramakrishnan, K. K.; Kalyanaraman, S., "Experimental study of link and transport protocols in interference-prone wireless LAN environments," Communication Systems and Net-works and Workshops, 2009. COMSNETS 2009. First International, vol., no., pp. 1-10, 5-10 Jan. 2009

[2] Lucian Popa and Afshin Rostamizadeh and Richard M. Karp and Christos Papadimitriou, balancing traffic load in wireless networks with curveball routing, In: Proc. ACM MOBIHOC, 2007

[3] Raffaele Bruno, Vania Conan, Stephane Rousseau, "A load dependent metric for balancing Inter-net traffic in Wireless Mesh Networks". In Proc. of 3rd IEEE International Workshop on Enabling Tech-nologies and Standards for Wireless Mesh Networking (Mesh Tech), Macau, October 2009.

[4] Pandey, A.; Jae Sung Lim, "CTB-MAC: Cluster-Based TDMA Broadcast MAC Protocol for Mobile Ad-Hoc Network," *Future Information Technology (Future Tech)*, 2010 5th International Conference on, vol., no., pp. 1-6, 21-23 May 2010.

The invention claimed is:

1. A method of allocating communications resources in a mobile meshed network comprising a plurality of nodes communicating with one another by way of radio links, each node comprising at least one processor, said communications resources comprising at least one time window comprising at least a plurality of time slots during which said nodes are or are not authorized to communicate, said meshed network being structured as a plurality of clusters each comprising at least one node, said method comprising:

generating, using at least one processor, a chart of configurations, each configuration comprising a different allocation priority index for each time slot of said time window, said allocation priority indices varying from 0 to n−1, n being a strictly positive integer equal to the number of time slots, assigning, using the at least one processor, a configuration, from among the generated configurations, to each cluster such that a strictly positive, predetermined number Np of allocation priority indices are not assigned to the same slots for the clusters which are mutually adjacent, and allocating, using the at least one processor, the time slots to intra cluster communications in order of the priorities which are defined in the configuration assigned to said cluster.

2. The method of allocating communications resources according to claim 1, wherein generating the chart of configurations comprises:

initializing the allocation priority indices of a first configuration to given values, and for each configuration of index c varying from 2 to the total number of configurations Nc;

generating a sequence MINc comprising n values associated with the n time slots, the value MINc(s) of the sequence MINc associated with a slot of index s in the time window being equal to the minimum index from among the allocation priority indices of the said slot of index s in all previously generated configurations, generating a sequence SUMc, comprising n values associated with the n time slots, the value SUMc(s) of the sequence SUMc associated with a slot of index s in the time window being equal to the sum of the allocation priority indices of the said slot of index s for all the previously generated configurations, separating the priority indices between indices of compulsory priority and indices of optional priority, the indices of compulsory priority being strictly smaller than a ratio n/c, and the indices of optional priority being greater than the ratio n/c, assigning the compulsory priority of index p to the time slot of index s for which the sequence MINc exhibits a maximum value, and if several slots have the sequence MINc that exhibits a maximum value, then the compulsory priority of index p is assigned to the slot for which the sequence SUMc exhibits a maximum value, and assigning the optional priority of index p to the time slot of index s for which the sequence SUMc exhibits a maximum value, and if several slots have the sequence SUMc that exhibits a maximum value, then the optional priority of index p is assigned to the slot for which the sequence MINc exhibits a maximum value.

3. The method of allocating communications resources according to claim 2, wherein a different chart of configurations is generated for each group of clusters comprising only mutually adjacent clusters, and initialization of the allocation priority indices is based on the configuration allocated to a cluster of the group also belonging to another group or based on an arbitrary configuration when none of the member clusters of the group is also a member of another group.

4. The method of allocating communications resources according to claim 2, wherein each cluster is assigned the configuration of minimum index c in the chart of configurations, which is not already assigned to another cluster.

5. The method of allocating communications resources according to claim 1, wherein, within a cluster, communications are prohibited on slots associated with a priority index greater than a predetermined threshold.

6. The method of allocating communications resources according to claim 1, wherein, in each cluster, a cluster-leader node executes a cluster leader function, and the cluster-leader node executes the allocating of the time slots to the intra cluster communications in the order of the priorities.

7. The method of allocating communications resources according to claim 1, wherein the assigning of the configuration to each cluster is carried out by a distributor that broadcasts the configuration index of each cluster to adjacent clusters.

8. The method of allocating communications resources according to claim 1, wherein said mobile meshed network is a cellular network and a cluster-leader node within each of the plurality of clusters is a base station.

9. The method of allocating communications resources according to claim 1, wherein the time window is a time division multiple access window.

10. The method of allocating communications resources according to claim 1, wherein the method is implemented by media access control or network layers of a protocol stack of each node.

11. An onboard communication system embedded in a mobile node communicating within a mobile ad-hoc network, the onboard communication system comprising at least one processor configured to implement the method of allocating communications resources according to claim 1.

12. An ad-hoc network comprising a plurality of mobile nodes communicating with one another, wherein each of the said nodes comprises the onboard communication system according to claim 11.

* * * * *